United States Patent
Assor et al.

(10) Patent No.: US 10,119,012 B2
(45) Date of Patent: Nov. 6, 2018

(54) FLAME-RETARDED POLYOLEFIN POLYMER COMPOSITION WITH REDUCED ANTIMONY TRIOXIDE CONTENT

(71) Applicant: ICL-IP America Inc., Ardsley, NY (US)

(72) Inventors: Yelena Assor, Beer Sheva (IL); Loir Melamed, Beer Sheva (IL); Marc Leifer, Gedera (IL); Sergei V. Levchik, Croton-on-Hudson, NY (US); Eyal Eden, Shoham (IL)

(73) Assignee: ICL-IP America Inc., Tarrytown, NY (US)

(*) Notice: Subject to any disclaimer, the term of this patent is extended or adjusted under 35 U.S.C. 154(b) by 23 days.

(21) Appl. No.: 15/114,671

(22) PCT Filed: Feb. 2, 2015

(86) PCT No.: PCT/US2015/014031
§ 371 (c)(1),
(2) Date: Jul. 27, 2016

(87) PCT Pub. No.: WO2015/123042
PCT Pub. Date: Aug. 20, 2015

(65) Prior Publication Data
US 2016/0340498 A1 Nov. 24, 2016

Related U.S. Application Data

(60) Provisional application No. 61/938,807, filed on Feb. 12, 2014.

(51) Int. Cl.
| | | |
|---|---|---|
| C08K 3/38 | (2006.01) | |
| C08K 3/22 | (2006.01) | |
| C08K 5/03 | (2006.01) | |
| C08L 23/00 | (2006.01) | |
| H01B 3/44 | (2006.01) | |
| C08K 9/12 | (2006.01) | |
| C09K 21/08 | (2006.01) | |
| C08L 23/06 | (2006.01) | |
| C08L 23/12 | (2006.01) | |
| C08L 27/18 | (2006.01) | |

(52) U.S. Cl.
CPC ............. *C08K 9/12* (2013.01); *C08K 3/2279* (2013.01); *C08K 5/03* (2013.01); *C08L 23/06* (2013.01); *C08L 23/12* (2013.01); *C08L 27/18* (2013.01); *C09K 21/08* (2013.01); *H01B 3/441* (2013.01); *C08K 2003/387* (2013.01); *C08L 2201/02* (2013.01); *C08L 2203/202* (2013.01)

(58) Field of Classification Search
CPC .......... C08K 3/2279; C08K 2003/2282; C08K 2003/387; C08K 3/38; C09K 21/00–21/02
See application file for complete search history.

(56) References Cited

U.S. PATENT DOCUMENTS

| | | | | |
|---|---|---|---|---|
| 3,576,940 A | * | 5/1971 | Stone | H01B 7/295 174/113 R |
| 3,897,387 A | * | 7/1975 | O'Shaughnessy | C08J 9/0095 106/18.12 |
| 6,737,456 B2 | * | 5/2004 | Bar-Yakov | C08K 5/0066 524/127 |
| 2012/0225980 A1 | | 9/2012 | Parsons | |

FOREIGN PATENT DOCUMENTS

| | | | | |
|---|---|---|---|---|
| EP | 1288260 A1 | * | 3/2003 | ........... C08K 3/0058 |
| GB | 2153832 A | * | 8/1985 | ............. C08K 13/02 |
| JP | 2540354 B2 | * | 10/1996 | |
| JP | 2003129056 A | * | 5/2003 | |
| WO | 2013085788 | | 6/2013 | |
| WO | 2013085789 | | 6/2013 | |
| WO | 2013085791 | | 6/2013 | |

OTHER PUBLICATIONS

Ebnesajjad, S.; Morgan, R. A.; Fluoropolymer Additives. 2012. Elsevier, Inc. pp. 129-131. (Year: 2012).*
Machine translation of JP2003-129056A. May 8, 2003. (Year: 2003).*
Machine Translation of JP2540354B. Oct. 2, 1996. (Year: 1996).*
Toure, B. et al. Incorporation of natural flame retardant fillers in an ethylene-propylene copolymer, in combination with a halogen-antimony system. Polymer Degradation and Stability, 1996, 54, pp. 345-352. (Year: 1996).*
International Preliminary Report on Patentability with Written Opinion dated Aug. 25, 2016.

* cited by examiner

*Primary Examiner* — Stephen E Rieth
(74) *Attorney, Agent, or Firm* — Dilworth & Barrese, LLP

(57) ABSTRACT

There is provided herein a flame-retarded polyolefin polymer composition with reduced antimony trioxide content comprising: (a) at least one polyolefin polymer; (b) at least one brominated flame retardant (c) at least one antimony trioxide synergist and, (d) at least one calcium borate on an inorganic carrier. There is also provided a method of making said flame retarded polyolefin polymer composition and article thereof.

18 Claims, No Drawings

FLAME-RETARDED POLYOLEFIN POLYMER COMPOSITION WITH REDUCED ANTIMONY TRIOXIDE CONTENT

This application claims priority to U.S. Provisional Patent Application No. 61/938,807 filed Feb. 12, 2014, the entire contents of which are incorporated herein by reference in their entirety.

FIELD OF THE INVENTION

The present invention relates to flame-retarded polymer compositions and more particularly to flame-retarded polyolefin polymer compositions and articles containing the same.

BACKGROUND OF THE INVENTION

Polyolefin polymers and more specifically polypropylene and its copolymers and polyethylene and its copolymers are used for the production of electronic parts such as housings, cases and lamps sockets, building construction elements such as roof membranes, wall panels, film and sheets as well as wire and cable insulations in transportation among others. In most of these applications, flame retardancy is needed and is usually provided by flame retardant systems based on a combination of brominated flame retardants with antimony trioxide as a synergist. But this type of flame retardant system has limitations, because antimony trioxide, being a very efficient synergist, tends to significantly increase smoke yield, which impairs visibility which could create problems for evacuation of people in the case of a fire. Further, antimony trioxide has a very high bulk density which increases the specific gravity of molded parts containing the same. This is especially undesirable in transportation and aviation applications. Furthermore, antimony trioxide has significantly increased in price in recent years. Still further, some recently introduced ecolabels require elimination of antimony trioxide from thermoplastic parts.

Although there is a clear need for low antimony trioxide or antimony trioxide-free flame retardant plastics, such plastics usually requires a significant increase in the loading of brominated flame retardant which is also undesirable.

SUMMARY OF THE INVENTION

It has been unexpectedly discovered by the inventors herein that calcium borate on an inorganic carrier can partially replace antimony trioxide synergist in a brominated flame retarded polyolefin polymers, more specifically in high density polyethylene and polypropylene homopolymer and polypropylene copolymer, without need of increase amount of brominated flame retardant. Such flame-retardant additive compositions provide flame retardant efficiency adequate to polyolefin polymers in electrical and electronic, buildings and transportation applications with significantly reduced loading of antimony trioxide.

The present invention is directed to the flame-retarded polyolefin polymer composition comprising:
(a) at least one polyolefin polymer;
(b) at least one brominated flame retardant;
(c) at least one antimony trioxide synergist; and,
(d) at least one calcium borate on an inorganic carrier Further, the flame-retarded polyolefin polymer composition can optionally further comprise antidripping agent, impact modifiers, heat stabilizers, antioxidants, processing aids, and other additives enhancing physical properties of the resin.

It will be understood herein that any reference to a flame-retarded polyolefin polymer composition is such that the composition contains reduced amount of antimony trioxide synergist.

DETAILED DESCRIPTION OF THE INVENTION

The present invention is directed to a flame retardant additive composition that comprises a unique and unexpected combination of a bromine compound, an antimony synergist, e.g., antimony trioxide and calcium borate on an inorganic carrier. Such flame retardant additive compositions can be used in polyolefin polymers and compositions containing polyolefin polymers, to provide flame retardancy at significantly reduced loadings of antimony trioxide.

Polyolefins are represented by two high volume thermoplastic polymers, polyethylene and polypropylene, as well as a large number of ethylene-propylene copolymers, and copolymers of other alkylene monomers. By varying the ratio of lower alkylene to higher alkylene co-monomer, a broad range of polymers, from thermoplastics to elastomers, can be produced. Similarly, ethylene can be copolymerized with vinyl acetate or ethyl acrylate, which combination reduces the crystallinity of the polyethylene and results in products having the characteristics of thermoplastic elastomers.

Polyolefin resin is widely used in the production of wire and cable jacketings, tubings, air ducts, thermal insulation systems, shipping pallets, computer cabinets, electrical appliances, interior household decorations, sockets for decorative lamps and automobile parts, among many other items. They are the polymers of choice due to their good processing characteristics, chemical resistance, weathering resistance, electrical properties and mechanical strength. One major disadvantage is that polyolefins are flammable. This has generated a growing demand for flame retarded polyolefins.

The polyolefin polymer (a) is preferably at least one of a polyethylene homopolymer, polyethylene copolymer, polypropylene homopolymer, and polypropylene copolymer. In one embodiment, the polyolefin polymer (a) is high-density polyethylene, low-density polyethylene or linear low density polyethylene. Amorphous, crystalline and elastomeric forms of polypropylene can be applied in this invention. Examples of the copolymers which can be used as the polyolefin polymer (a) are at least one of, such as, but not limited to, ethylene-vinyl acetate (EVA); ethylene-propylene rubber (EPR); ethylene-propylene-diene-monomer rubber (EPDM); and, copolymers of ethylene and propylene with butene-1, pentene-1,3-methylbutene-1,4-methylpentene-1, octane-1 and mixtures thereof.

The polyolefin polymer is preferably applied in the pellet form having a melting point in the range of from about 150 to about 250 Celsius (C), most preferably from about 175 C to about 230 C. The polyolefin polymer preferably has a specific gravity in the range of from about 0.85 to about 1.2 and most preferably about 0.90-1.0. The polyolefin resin of choice preferably has a melt flow rate in the range of from about 0.2 to about 30 g/10 min., and more preferably, from about 1 to about 12 g/10 min.

The polyolefin polymer (a) is preferably present in the polyolefin polymer composition in a range from 50 to 95 wt. %, more preferably from 65 to 90 wt. % based on the total weight of the composition.

Brominated flame retardant (b) includes any flame retardant which contains a bromine atom in its chemical structure. The most specific brominated flame retardant compounds (b) have the following formulae.

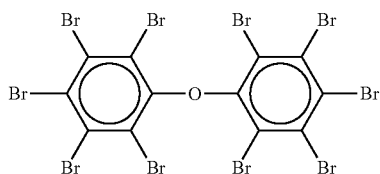
Decabromodiphenyl oxide sold under the trade name FR-1210
(I)

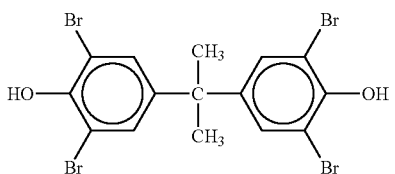
Tetrabromobisphenol A sold under the trade name FR-1524
(II)

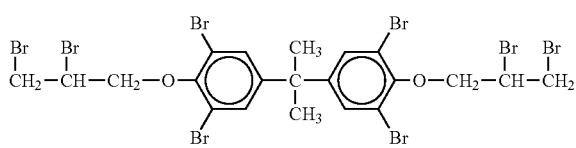
Tetrabromobisphenol A bis (2,3-dibromopropyl ether) sold under the trade name FR-720
(III)

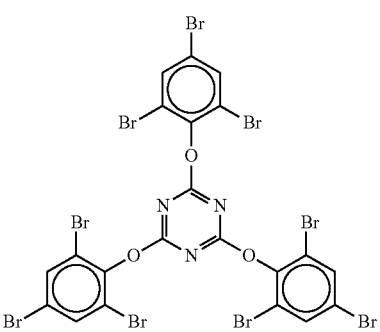
Tris(tribromophenoxy)triazine sold under the trade name FR-245
(IV)

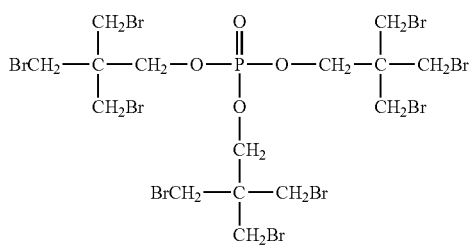
Tris(tribromoneopenyl) phosphate sold under the trade name FR-370
(V)

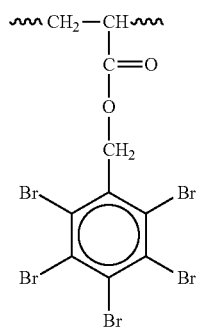
Brominated polyacrylate sold under the trade name FR-1025
(VI)

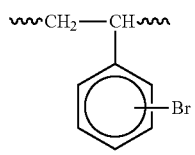
Brominated polystyrene sold under the trade name FR-803P
(VII)

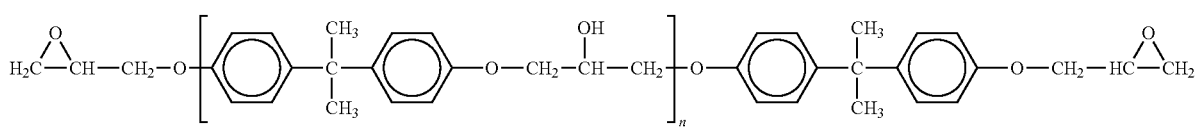
Brominated epoxy polymers sold under the trade name F-2000 series
(VIII)

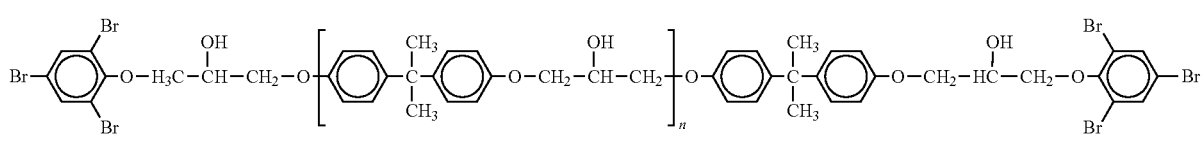
Brominated end-capped epoxy polymers sold under the trade name F-3000 series
(IX)

-continued

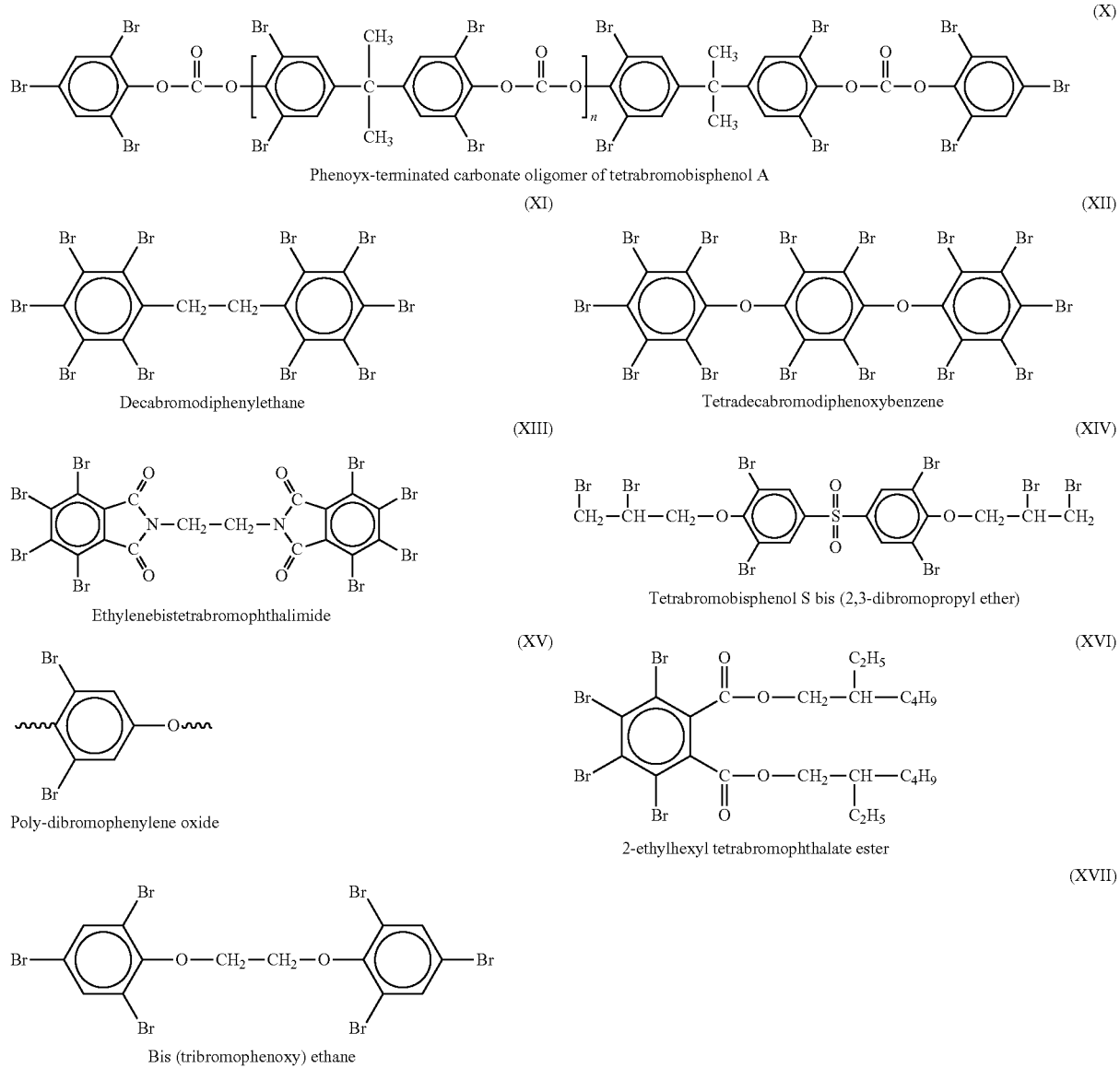

Preferably, the brominated flame retardant (b) is present in the flame-retarded polyolefin polymer composition in the range of from about 2 wt % to about 40 wt % and specifically in the range from about 5 wt % to about 30 wt % based on the total weight of the flame-retarded polyolefin polymer composition.

Antimony synergist (c) (e.g., antimony trioxide) if used herein shows a synergistic effect with the brominated flame retardant and the calcium borate on an inorganic carrier and can serve to further improve the flame retardancy of the polyolefin polymer when it is compounded.

In addition to antimony trioxide, some other examples of antimony synergist (c) can be antimony pentaoxide or sodium and combinations of any of the noted antimony synergists.

The average particle size of antimony synergist (c) is specifically from 0.5 µm to 5 µm. Antimony synergist (c) may be surface-treated with an epoxy compound, silane compound, isocyanate compound, titanate compound, or the like as required. Antimony synergist (c) can be used as a powder or as a masterbatch compounded in a carrier resin. Typically a masterbatch contains 50-80 wt. % pre-dispersed antimony syngerist (c) such as the non-limiting example of antimony trioxide. Use of a masterbach impoves safety of the operation eliminating the handling of hazardous powder and improves dispersion of antimony synergist (c) in the flame-retarded polyolefin polymer composition.

In one non-limiting embodiment the antimony synergist (c) can be present in an amount from 0.5 to 10 weight percent, more preferably from 2 to 7 weight percent based on the total weight of the flame-retarded polyolefin polymer composition.

The calcium borate on an inorganic carrier (d), which is used herein, can in one embodiment be manufactured by the reaction of lime with boric acid in the presence of an inorganic carrier, in a water suspension, with subsequent drying, milling and sieving. The calcium borate on an inorganic carrier can in addition to the calcium borate comprise any known solid inorganic material as the inorganic carrier. Some non-limiting examples of solid inorganic material which may function as the inorganic carrier are aluminum hydroxide, boehmite, natural calcium carbonate, precipitated calcium carbonate, calcium sulphate, carbon black, carbon fibers, clay, cristobalite, diatomaceous earth, dolomite, feldspar, graphite, glass beads, glass fibers, kaolin, magnesium carbonate, magnesium hydroxide, metal powders or fibers, mica muscouite, mica phlogopite, natural silica, synthetic silica, nepheline-syenite, talc, whiskers, natural wollastonite or synthetic calcium silicate, and combinations thereof.

In one non-limiting embodiment the inorganic carrier for the calcium borate on an inorganic carrier is wollastonite. More specifically, the calcium borate on an inorganic carrier (e.g. wherein the inorganic carrier is wollastonite) is such that the particles of calcium borate on the inorganic carrier (e.g wollastonite) have a mean particle size ($d_{50}$) of from about 1 micron to about 15 microns and 99 weight percent of the total amount of particles of calcium borate on an inorganic carrier have a diameter ($d_{99}$) of less than about 50 microns, and more specifically, a $d_{50}$ of from about 2 microns to about 10 microns and a $d_{99}$ of less than about 25 microns. In one embodiment, the calcium borate on an inorganic carrier contains from about 20 to about 80 weight percent of wollastonite and from about 20 to about 80 weight percent of calcium borate, provided that the total weight percent of calcium borate and the total amount of inorganic carrier is equal to 100 weight percent.

In one embodiment herein the calcium borate on any inorganic carrier (d) herein can be present in an amount of from about 1 to about 10 weight percent, and more preferably from about 2 to about 7 weight percent based on the total weight of the flame-retarded polyolefin polymer composition.

In one embodiment herein the antidripping agent is used in order to further improve efficiency of the flame-retarded polyolefin thermoplastic polymer composition. The antidripping agent is generally a fluoropolymer or copolymer containing a fluoro-ethylenic structure. More specifically the antidripping agent is polytetrafluoroethylene (PTFE). Among polytetrafluoroethylenes, the use of those which are capable of forming fibrils can impart especially high melt-dripping preventing ability. The fibril-forming polytetrafluoroethylene used herein is not specifically limited. Specific examples of the polytetrafluoroethylene capable of forming fibrils include Teflon 6C (registered trademark of DuPont) or Hostaflon 2071 (registered trademark of Dynon).

The flame-retarded polyolefin polymer composition may also be reinforced or filled. Suitable fillers for the thermoplastic polyolefin polymer include typical reinforcing and non-reinforcing fillers such as precipitated and fumed silicas, ground quartz, diatomaceous earth, ground limestone, ground felspar, mica, expanded mica, precipitated calcium carbonate, etc. The term "reinforcing" with respect to fillers generally refers to fillers of small size and high surface area, for example mean particle sizes of about 0.1 μm or less, and specific surface areas (BET) of 50 $m^2$/g or higher while non-reinforcing fillers, which are preferred, have larger particles sizes, e.g. 1 to 100 μm, preferably 1 to 20 μm. Suitable fibrous fillers are typically short or long glass fibers. Other fibrous reinforcement such as aramid fiber, carbon fiber, boron nitride fiber, etc., may also be used, however such materials are generally more expensive than glass fibers.

Other ingredients that can be employed in amounts less than 10 percent by weight of the low antimony trioxide flame-retarded polyolefin polymer composition, specifically less than 5 percent by weight, include the non-limiting examples of antidripping agents, lubricants, heat stabilizers, light stabilizers and other additives used to enhance the properties of the resin. Such other ingredients may be specifically utilized in amounts from 0.01 to 5 percent by weight of the total weight of the low antimony trioxide or antimony free flame-retarded polyolefin polymer composition and include specific examples such as hindered phenols and phosphites.

The flame-retarded polyolefin polymer composition with reduced antimony trioxide content or articles made therefrom herein can have a flame retardancy classification of one or more of HB, V-2, V-1, V-0 and 5VA according to UL-94 protocol. In one embodiment, the low antimony trioxide flame-retarded polyolefin polymer composition can have a flame retardancy of at least V-2, V-1 or V-0.

In one embodiment herein the flame-retarded polyolefin polymer composition, or articles produced therefrom, contains from 10% to about 90% less antimony synergist than the amount of antimony synergist present in an identical flame-retarded polyolefin polymer composition that is in the absence of calcium borate on an inorganic carrier while still providing a V-0 flame retardancy. In a more specific embodiment, the flame-retarded polyolefin polymer composition, or articles produced therefrom, contains from 20% to about 80% less antimony synergist than the amount of antimony synergist present in an identical flame-retarded polyolefin polymer composition that is in the absence of calcium borate on an inorganic carrier while still providing a V-0 flame retardancy. Even more specifically, the flame-retarded polyolefin polymer composition, or articles produced therefrom, contains from 25% to about 75% less antimony synergist than the amount of antimony synergist present in an identical flame-retarded polyolefin polymer composition that is in the absence of calcium borate on an inorganic carrier while still providing a V-0 flame retardancy. The same above-noted ranges of amounts of lower antimony synergist in the flame-retarded polyolefin polymer composition, or articles produced therefrom, of the present invention as compared to an identical flame-retarded polyolefin polymer composition that is in the absence of calcium borate on an inorganic carrier still has at least one of the same tensile modulus, tensile strength, elongation at break, Izod notched impact, melt flow index and heat distortion temperature.

There is also provided herein a method of making a flame-retarded polyolefin polymer composition with reduced antimony trioxide content or articles made therefrom comprising (1) blending the polyolefin polymer (a) and other ingredients (b), (c) and (d) in powder or granular form, and (2) extruding the blend and comminuting the blend into pellets or other suitable shapes. Blending and compounding of the low antimony flame-retarded polyolefin polymer compositions of this invention, can be carried out by any other conventional techniques.

Although it is not essential, the best results are obtained if the ingredients (a), (b), (c) and (d) are compounded, pelletized and then molded into a desirable article. Compounding can be carried out in conventional equipment. For example, the polyolefin polymer (a), other ingredients (b), (c) and (d), and, optionally, other additives are fed into a twin screw extruder in the form of a dry blend of the composition, the screw employed having a long transition section to insure proper melting.

The flame-retarded polyolefin polymer composition with reduced antimony trioxide content can be molded in any equipment conventionally used for polymer compositions. If necessary, depending on the molding properties of the polyolefin polymer (a), the amount of additives, resin flow and the rate of solidification of the polyolefin polymer (a), those skilled in the art will be able to make the conventional adjustments in molding cycles to accommodate the composition.

The following examples are used to illustrate the present invention.

EXAMPLES

Example 1

285 gallons of cold city water (about 50-70 degrees F.) were added to a 1000 gallon stainless steel reactor. This was followed by addition of 262 lbs of hydrated lime, Ca(OH)$_2$, 1000 lbs of wollastonite (calcium metasilica, NYAD M1250, ex. Nyco) and 430 lbs of boric acid. The mixture was suspended and mixed for at least 10 minutes to complete the reaction. The temperature in the reactor increased to about 90-120 degrees F. The slurry of the product was then pumped to a surge tank and then it was pumped through a wet milling system 35 U Palla followed by M60 Sweco vibrating mills (½ inch ceramic cylindrical media). The wet-milled product was pumped into a steam heated drum dryer operating at 190-240 degrees F. and was then conveyed by a hot air line with the end temperature setup at about 310 degrees F. At the final stage the dried product went through a ACM60 grinding mill further decreasing the particle size to $d_{50}=7$ micron and $d_{99}<25$ micron. The final product was packaged into bags.

Examples 2-12

In order to prepare samples of the flame-retarded polyolefin composition that illustrate the invention, the following materials and procedures have been used.

1. Materials.

A list of the materials used in these examples is as follows:
- ($a_1$)—High density polyethylene (HDPE), Lupolen 5031, ex. LyondellBasell
- ($a_2$)—Polypropylene homopolymer (PP), Capilene G-86, ex. Cannel Olefins
- ($a_3$)—Impact modified polypropylene (PP copo), Capilene SL-50, ex. Carmel Olefins
- (b)—Decabromodiphenyl Ethane, FR-1410, ex. ICL-IP
- (c)—80% masterbatch of antimony trioxide, universal grade, FRO0112, ex. Kafrit
- (d)—Calcium borate on silicate carrier, Example 1, FR-1120, ex. ICL-IP
- (e)—Polytetrafluoroethylene, PTFE, Hostaflon 2711, ex. Dyneon
- (f)—Antioxidant and heat stabilizer, Irganox B-225, ex. BASF 2. Compounding The polymer pellets, brominated flame retardants, antimony trioxide masterbatch, calcium borate on silicate carrier were weighed on a semi analytical scale with consequent manual mixing in plastic bags. The mixtures were introduced into the main feeding port of the extruder using an Accurate Feeder.

Compounding was performed in a twin-screw co-rotating extruder ZE25 with L/D=32 ex Berstorff. The extruded strands were pelletized in a pelletizer 750/3 ex Accrapak systems limited.

The obtained pellets were dried in a circulating air oven ex Heraeus instruments at 75° C. for 3 hours.

3. Injection Molding.

Test specimens were prepared by injection molding the pellets of compounded mixtures in Allrounder 500-150 ex. Arburg.

4. Testing

Before testing, the specimens were conditioned at 23° C. for 168 hours.

Vertical flammability test—UL-94 V protocol, specimen thickness 1.6.

Heat distortion temperature, HDT—ASTM D648, DDT/VICAT Plus Davenport

Tensile properties—ASTMD638, Zwick 1435.

Notched Izod impact—ASTM D256, Instron Ceast 9050 pendulum impact tester.

Melt flow index, MFI—ASTM D1238, Meltflixer 2000, ex. Thermo Hake

4. Results

Compositions, flammability and physical properties are presented in Table 1. Comparative example C2 show standard formulations recommended in technical literature for V-0 rated high density polyethylene. As shown in example 3, replacement of about 3.5 wt. % antimony trioxide (50% based on the antimony content) with 3 wt. % FR-1120 allowed the preservation of the V-0 rating and the comparable physical properties to the standard formulation. As shown in comparative example C4, replacement of all antimony trioxide with 9 wt. % FR-1120 resulted in loss of UL-94 rating.

TABLE 1

Compositions, flammability performance and physical properties of flame-retarded polyolefin polymers

| | Example | | | | | | | | | | |
|---|---|---|---|---|---|---|---|---|---|---|---|
| | C. 2 | 3 | C. 4 | C. 5 | 6 | 7 | C. 8 | C. 9 | 10 | 11 | C. 12 |
| Composition, wt. % | | | | | | | | | | | |
| $a_1$ | 64.1 | 65.4 | 63 | | | | | | | | |
| $a_2$ | | | | 57.4 | 58.8 | 59.6 | 60.3 | | | | |
| $a_3$ | | | | | | | | 57.4 | 58.8 | 59.6 | 60.3 |
| b | 26.8 | 26.8 | 26.8 | 28.0 | 28.0 | 28.0 | 28.0 | 28.0 | 28.0 | 28.0 | 28.0 |
| c | 8.4 | 3.9 | 0 | 14.4 | 7.2 | 3.6 | | 14.4 | 7.2 | 3.6 | |
| (ATO)[1] | (6.7) | (3.2) | | (11.5) | (5.8) | (2.9) | | (11.5) | (5.8) | (2.9) | |
| d | 0 | 3.2 | 9.5 | | 5.8 | 8.6 | 11.5 | | 5.8 | 8.6 | 11.5 |
| e | 0.5 | 0.5 | 0.5 | | | | | | | | |
| f | 0.2 | 0.2 | 0.2 | 0.2 | 0.2 | 0.2 | 0.2 | 0.2 | 0.2 | 0.2 | 0.2 |

TABLE 1-continued

Compositions, flammability performance and physical properties of flame-retarded polyolefin polymers

| | Example | | | | | | | | | | |
|---|---|---|---|---|---|---|---|---|---|---|---|
| | C. 2 | 3 | C. 4 | C. 5 | 6 | 7 | C. 8 | C. 9 | 10 | 11 | C. 12 |
| Properties | | | | | | | | | | | |
| UL 94V rating, 1.6 mm | V-0 | V-0 | NR | V-0 | V-0 | V-0 | V-2 | V-0 | V-0 | V-0 | V-2 |
| Tensile modulus, MPa | 1,400 | 1,490 | | 1,990 | 2,040 | 2,070 | | 1,740 | 2,010 | 2,010 | |
| Tensile strength, Mpa | 23 | 23 | | 27 | 27 | 25 | | 21 | 22 | 21 | |
| Elongation at break, % | 175 | 74 | | 175 | 82 | 58 | | 147 | 127 | 107 | |
| Izod notched impact, J/m | 44 | 47 | | 33 | 22 | 20 | | 70 | 42 | 50 | |
| MFI, g/10 min | 4 | 4 | | 3 | 4 | 4 | | 5 | 6 | 5 | |
| HDT, ° C. | 48 | 49 | | 55 | 54 | 59 | | 59 | 56 | 61 | |

[1]Antimony trioxide: the values of ATO in brackets represents 80% by weight of the value of component (c) which component (c) is a masterbatch of antimony trioxide, universal grade, FR00112, ex. Kafrit Comparative example C5 show standard formulations recommended in technical literature for V-0 rated polypropylene homopolymer. As shown in examples 6 and 7, replacement of about 5.7 wt. % antimony trioxide (50% based on the antimony content) and 8.8 wt. % (75% based on the antimony content) with 5.8 and 8.6 wt. % FR-1120 respectively allowed the preservation of the V-0 rating and the comparable physical properties to the standard formulation. As shown in comparative example C8, replacement of all antimony trioxide with 11.5 wt. % FR-1120 resulted in loss of UL-94 rating.

Comparative example C9 show standard formulations recommended in technical literature for V-0 rated impact modified polypropylene. As shown in examples 10 and 11, replacement of about 5.7 wt. % antimony trioxide (50% based on the antimony content) and 8.8 wt. % (75% based on the antimony content) with 5.8 and 8.6 wt. % FR-1120 respectively allowed the preservation of the V-0 rating and the comparable physical properties to the standard formulation. As shown in comparative example C12, replacement of all antimony trioxide with 11.5 wt. % FR-1120 resulted in loss of UL-94 rating.

Thus, the formulations of examples 3, 6, 7, 10 and 11 represent flame-retarded polyolefin compositions with reduced antimony trioxide content.

While the above description comprises many specifics, these specifics should not be construed as limitations, but merely as exemplifications of specific embodiments thereof. Those skilled in the art will envision many other embodiments within the scope and spirit of the description as defined by the claims appended hereto.

The invention claimed is:

1. A flame-retarded polyolefin polymer composition comprising:
   (a) at least one polyolefin polymer in an amount from about 50 wt % to about 95 wt %;
   (b) at least one brominated flame retardant in an amount of from about 2 wt % to about 40 wt %;
   (c) at least one antimony synergist in an amount of from about 0.5 wt % to about 10 wt % and,
   (d) calcium borate on an inorganic carrier which is made by a process of reacting boric acid and lime in the presence of the inorganic carrier, and which is present in an amount of from about 1 wt % to about 10 wt %, and wherein the inorganic carrier is selected from the group consisting of aluminum hydroxide, boehmite, natural calcium carbonate, precipitated calcium carbonate, calcium sulphate, carbon black, carbon fibers, clay, cristobalite, diamotaceous earth, dolomite, feldspar, graphite, glass beads, glass fibers, kaolin, metal powders or fibers, mica muscovite, mica phlogopite, natural silica, synthetic silica, silicates, nepheline-syenite, talc, whiskers, natural wollastonite, or synthetic calcium silicate, and combinations thereof,
   all said amounts being based on the total weight of the flame-retarded polyolefin polymer composition, and wherein the composition contains from 10 wt % to about 90 wt % less antimony synergist than the amount of antimony synergist present in an identical flame-retarded polyolefin polymer composition that is in the absence of the calcium borate on the inorganic carrier while still providing a V-0 flame retardancy.

2. The flame-retarded polyolefin polymer composition of claim 1, wherein polyolefin polymer (a) is at least one selected from the group consisting of high-density polyethylene, low-density polyethylene, linear low density polyethylene, polyethylene copolymers, crystalline polypropylene, amorphous polypropylene, and polypropylene copolymers.

3. The flame-retarded polyolefin polymer composition of claim 1, wherein polyolefin polymer (a) is selected from the group consisting of ethylene-vinyl acetate (EVA); ethylene-propylene rubber (EPR); ethylene-propylene-diene-monomer rubber (EPDM); copolymers of ethylene or propylene with one of butene-1, pentene-1, 3-methylbutene-1, 4-methylpentene-1, or octene-1; and, mixtures thereof.

4. The flame-retarded polyolefin polymer composition of claim 1, wherein brominated flame retardant (b) is at least one compound selected from the group consisting of decabromodiphenyl oxide, tetrabromobisphenol A, tetrabromobisphenol A bis (2,3-dibromopropyl ether), tris(tribromoneopentyl)triazine, tris(tribromoneopenyl) phosphate, brominated polyacrylate, brominated polystyrene, brominated epoxy polymers, brominated end-capped epoxy polymers, phenoxy-terminated carbonate oligomer of tetrabromobisphenol A, decabromodiphenylethane, tetradecabromodiphenoxybenzene, ethylenebistetrabromophthalimide, tetrabromobisphenol S bis (2,3-dibromopropyl ether), poly-dibromophenylene oxide, 2-ethylhexyl tetrabromophthalate ester and bis (tribromophenoxy) ethane.

5. The flame-retarded polyolefin polymer composition of claim 1, wherein the antimony synergist (c) is antimony trioxide.

6. The flame-retarded polyolefin polymer composition of claim 1, wherein the inorganic carrier is natural wollastonite.

7. The flame-retarded polyolefin polymer composition of claim 1, further comprising an antidripping agent which is polytetrafluoroethylene.

8. The flame-retarded polyolefin polymer composition of claim 5 wherein the antimony trioxide content is from about 2 wt % to about 7 wt % based on the total weight of the flame-retarded polyolefin polymer composition.

9. The flame-retarded polyolefin polymer composition of claim 1 wherein the polyolefin polymer (a) is present in an amount of from about 65 wt % to about 90 wt %; brominated flame retardant (b) in an amount of from about 5 wt % to about 30 wt %; antimony synergist (c) in an amount of from about 2 wt % to about 7 wt % weight percent and calcium borate on silicate carrier (d), in an amount of from about 2 wt % to about 7 wt % all based on the total weight of the flame-retarded polyolefin polymer composition.

10. An article comprising the flame-retarded polyolefin polymer composition of claim 1.

11. The article of claim 10 wherein the article is an electronic part.

12. The article of claim 10 wherein the article is a building construction element.

13. The article of claim 10 wherein the article is a wire and cable insulation.

14. A method of making a flame-retarded polyolefin thermoplastic article comprising:
(1) blending:
 (a) at least one polyolefin polymer in an amount from about 50 wt % to about 95 wt %;
 (b) at least one brominated flame retardant in an amount of from about 2 wt % to about 40 wt %;
 (c) at least one antimony synergist in an amount of from about 0.5 wt % to about 10 wt %;
 (d) calcium borate on an inorganic carrier which is made by a process of reacting boric acid and lime in the presence of the inorganic carrier, in an amount of from about 1 wt % to about 10 wt %,
 wherein the inorganic carrier is selected from the group) consisting of aluminum hydroxide, boehmite, natural calcium carbonate, precipitated calcium carbonate, calcium sulphate, carbon black, carbon fibers, clay, cristobalite, diatomaceous earth, dolomite, feldspar, graphite, glass beads, glass fibers, kaolin, metal powders or fibers, mica muscovite, mica phlogopite, natural silica, synthetic silica, silicates, nepheline-svenite, talc, whiskers, natural wollastonite, or synthetic calcium silicate, and combinations thereof; and optionally, at least one selected from the group consisting of an antidripping agent, a filler, an antioxidant, a heat stabilizer and a lubricant, to provide a flame-retarded polyolefin polymer composition, all said amounts being based on the total weight of the flame-retarded polyolefin polymer composition, which composition contains from 10 wt % to about 90 wt % less antimony synergist than the amount of antimony synergist present in an identical flame-retarded polyolefin polymer composition that is in the absence of calcium borate on the inorganic carrier while still providing a V-0 flame retardancy; and,
(2) shaping the flame retarded polymer composition into a flame-retarded thermoplastic polyolefin article.

15. A flame-retarded thermoplastic article made by the claim 14.

16. The article of claim 15 wherein the article is an electronic part.

17. The article of claim 15 wherein the article is a building construction element.

18. The article of claim 15 wherein the article is a wire and cable insulation.

* * * * *